United States Patent [19]

Benjamin et al.

[11] Patent Number: 6,015,311
[45] Date of Patent: Jan. 18, 2000

[54] CONTACT CONFIGURATION FOR SMART CARD READER

[75] Inventors: Karen Elizabeth Benjamin; John Joseph Consoli, both of Harrisburg, Pa.

[73] Assignee: The Whitaker Corporation, Wilmington, Del.

[21] Appl. No.: 08/954,720

[22] Filed: Oct. 20, 1997

Related U.S. Application Data

[60] Provisional application No. 60/033,658, Dec. 17, 1996.

[51] Int. Cl.[7] .................................................. H01R 11/22
[52] U.S. Cl. ......................... 439/267; 235/441; 439/188
[58] Field of Search ................................. 439/188, 267, 439/260; 235/492, 441, 443, 483, 475

[56] References Cited

U.S. PATENT DOCUMENTS

| | | | |
|---|---|---|---|
| 3,893,173 | 7/1975 | Taggart et al. | 360/60 |
| 4,221,448 | 9/1980 | Logerot et al. | 339/75 MP |
| 4,721,348 | 1/1988 | Mouissie | 439/328 |
| 4,724,310 | 2/1988 | Shimamura et al. | 235/483 |
| 4,735,578 | 4/1988 | Reichardt et al. | 439/152 |
| 4,887,188 | 12/1989 | Yoshida et al. | 361/413 |
| 4,938,716 | 7/1990 | Chabrolle et al. | 439/635 |
| 4,961,710 | 10/1990 | Komatsu | 439/267 |
| 5,012,078 | 4/1991 | Pernet | 235/441 |
| 5,013,255 | 5/1991 | Juret et al. | 439/260 |
| 5,033,972 | 7/1991 | Komatsu et al. | 439/153 |
| 5,051,566 | 9/1991 | Pernet | 235/441 |
| 5,091,618 | 2/1992 | Takahashi | 235/441 |
| 5,259,777 | 11/1993 | Schuder et al. | 439/188 |
| 5,321,247 | 6/1994 | Mroczkowski et al. | 235/68 |
| 5,330,363 | 7/1994 | Gardner et al. | 439/188 |
| 5,334,034 | 8/1994 | Reichardt et al. | 439/188 |
| 5,334,827 | 8/1994 | Bleier et al. | 235/492 |
| 5,336,877 | 8/1994 | Raab et al. | 235/475 |
| 5,395,259 | 3/1995 | Casses | 439/188 |
| 5,463,210 | 10/1995 | Imura | 235/441 |
| 5,667,397 | 9/1997 | Broschard, III et al. | 439/188 |
| 5,674,085 | 10/1997 | Davis et al. | 439/188 |
| 5,872,353 | 2/1999 | Reichardt et al. | 235/441 |
| 5,898,159 | 4/1999 | Huang | 235/441 |
| 5,911,587 | 6/1999 | Vermeersch | 439/188 |
| 5,917,177 | 6/1999 | Owa et al. | 235/486 |
| 5,936,222 | 8/1999 | Korsunsky et al. | 235/441 |

FOREIGN PATENT DOCUMENTS

| | | | |
|---|---|---|---|
| 0 493 473 B1 | 9/1990 | European Pat. Off. | G05K 7/06 |
| 0 476 892 A1 | 3/1992 | European Pat. Off. | G07F 7/00 |
| 0 468 828 B1 | 10/1994 | European Pat. Off. | H01R 23/68 |
| 298 08 589 U1 | 5/1998 | Germany | H01R 23/68 |

OTHER PUBLICATIONS

International Search Report, Applicant's file reference 16691 PCT, International application No. PCT/US 97/23268, International filing date, Dec. 16, 1997.

*Primary Examiner*—Kheim Nguyen
*Assistant Examiner*—Michael C. Zarroli

[57] ABSTRACT

A landing type smart card reader 10 is provided having a base 14, a cover 12, and a contact carrier 50. Spring arms 22 formed in the cover 12 cooperate with the contact carrier 50 to bias the contacts 18 away from an inserted smart card 102. Upon insertion of a smart card 102, the spring arms 22 will disengage the contact carrier 50 and the contacts 18 will land on and make electrical connection with pads of the smart card 102.

20 Claims, 9 Drawing Sheets

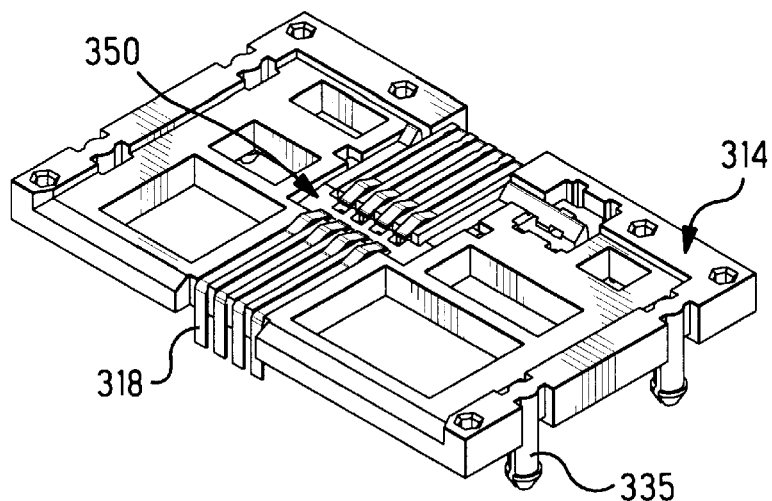
FIG. 12
FIG. 13
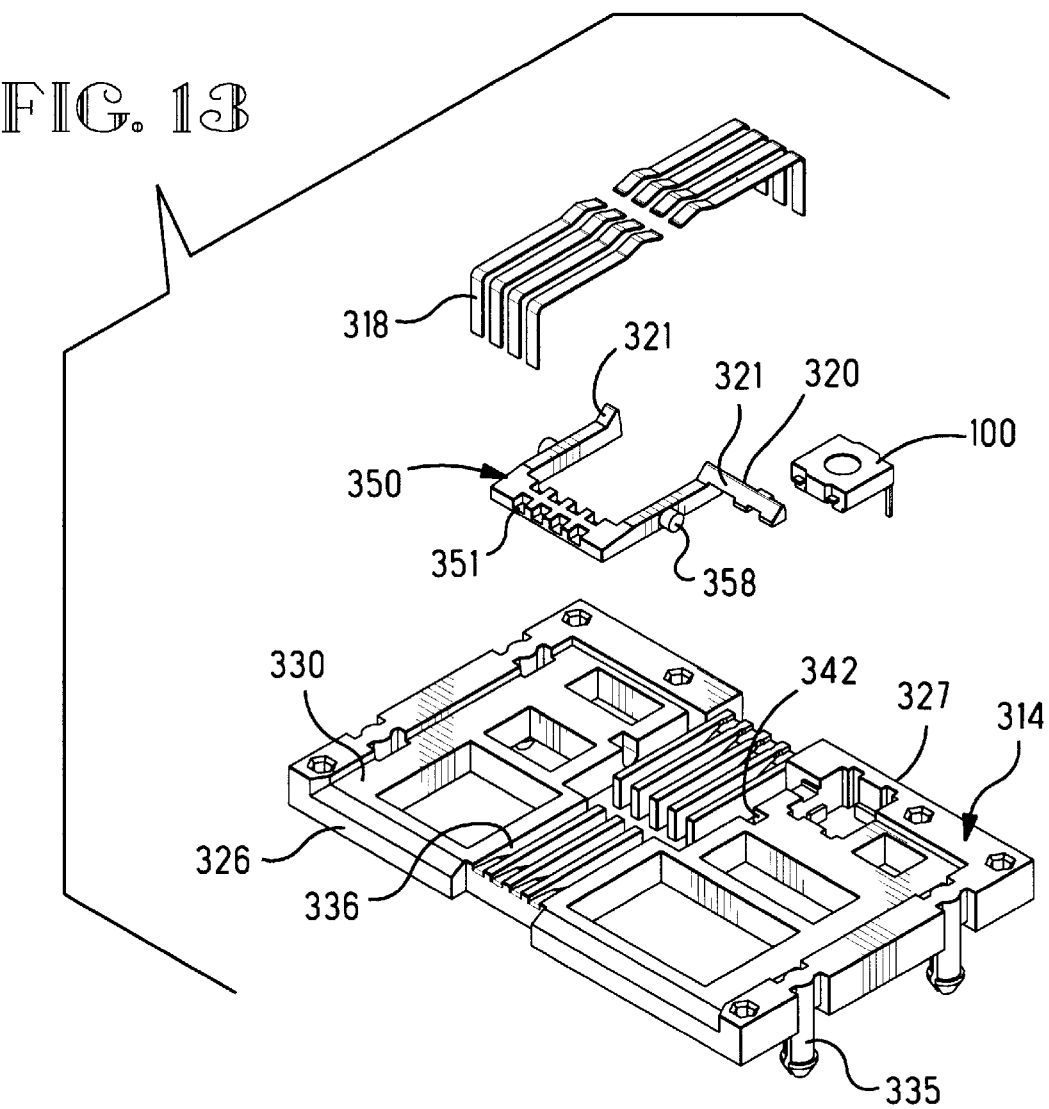

CONTACT CONFIGURATION FOR SMART CARD READER

This application claims the benefit of U.S. Provisional Application No. 60/033,658, filed Dec. 17, 1996.

FIELD OF THE INVENTION

This invention is related to smart card readers and more particularly to an electrical connector which provides a temporary electrical connection between the pads of a smart card and a printed circuit board.

BACKGROUND OF THE INVENTION

Smart cards are well known in the industry as being cards having computer chips embedded therein which are connected to metallic contact pads on a major surface of the card. These smart cards are insertable into smart card readers which make electrical contact with the pads of the smart card through contacts mounted in the smart card reader housing.

There are currently two types of smart card reader connectors available, sliding type and landing type. One example of the sliding type reader is disclosed in U.S. Pat. No. 5,334,827 by Bleier et al. Bleier et al. show a sliding type reader in which a smart card is inserted into the reader and is slid over the contacts until they are aligned with the pads of the smart card. The contacts are spring loaded against the smart card while the smart card is slid into the read position. A full normal force is exerted against the smart card during the entire mating and unmating cycle to affect a wiping action from the front edge of the card along the major plastic surface and finally on to the contact pads of the smart card.

A problem exists with the sliding type card readers as disclosed by Bleier et al. in that excess wear occurs on the reader contacts due to a long wiping path at a high normal force during the mating and unmating cycle. Also, as a result, debris is picked up by the reader contacts as they slide along the card surface. This debris is then deposited onto the card mating pads making it more difficult to achieve a reliable electrical connection. Another problem exists with such sliding type connectors in that the wiping path along the plastic surface of the card will mar any art work which appears on the surface creating undesirable streaks where the wiping action has occurred.

An example of the landing type smart card readers is disclosed in U.S. Pat. No. 4,976,630 by Schuder et al. Schuder et al. teach a smart card reading apparatus including a stationary frame and a contact element support mounted within an opening in the frame for reciprocal movement between a read position and an initial position. Movement of the contact element support into a read position is initiated by pushing the smart card into the reader. Return of the support to the initial position is accomplished by a spring which biases the support to the initial position upon removal of the smart card from the reader. Such a design is complex in that it requires the contact support to both translate in the mating direction and move transverse to the mating direction in order to land on the contact pads of the smart card.

Another example of a landing type smart card reader is disclosed in EP Patent No. 0 468 828 which teaches a smart card reader having a control lever. The control lever is pivotally attached to a support frame and controls the movement of the contacts so that they engage pads of the card when it is in the read position and disengage the card as it is withdrawn and in the idle position. A pair of helical springs serve to bias the control lever and contacts into the idle position whereby the contacts will not engage the card. The card, upon insertion, engages a cam surface of the control lever to pivot the lever and contacts toward the card pads to establish an electrical connection therebetween.

A problem exists with both of these landing type smart card readers in that they involve complex actuating mechanisms. Both designs require separate spring members to urge the contacts and/or the control lever. It is desirable to reduce the number of parts necessary in order to accomplish a simplified landing type smart card reader.

SUMMARY OF THE INVENTION

It is therefore an object of this invention to provide a simplified design for a landing type smart card reader capable of many mating cycles without unduly wearing the contacts.

The object of the invention has been achieved by providing a smart card reader having a base, a contact carrier, and a cover. The cover is profiled to have a top wall from which at least one spring arm extends into a card-receiving area to engage and bias the contact carrier such that the contacts are spaced apart from the pads of the smart card until the card is moved into an inserted read position. Securing members also extend from the cover and cooperate with features on the base in a complimentary securing area to secure the cover to the base.

BRIEF DESCRIPTION OF THE DRAWINGS

The invention will now be described by way of example with reference to the accompanying figures of which:

FIG. 12 shows a three-dimensional view of an alternate embodiment of the smart card reader according to this invention.

FIG. 13 shows an exploded three-dimensional view of the smart card reader of FIG. 12.

DETAILED DESCRIPTION OF THE EMBODIMENTS

Figure 1:
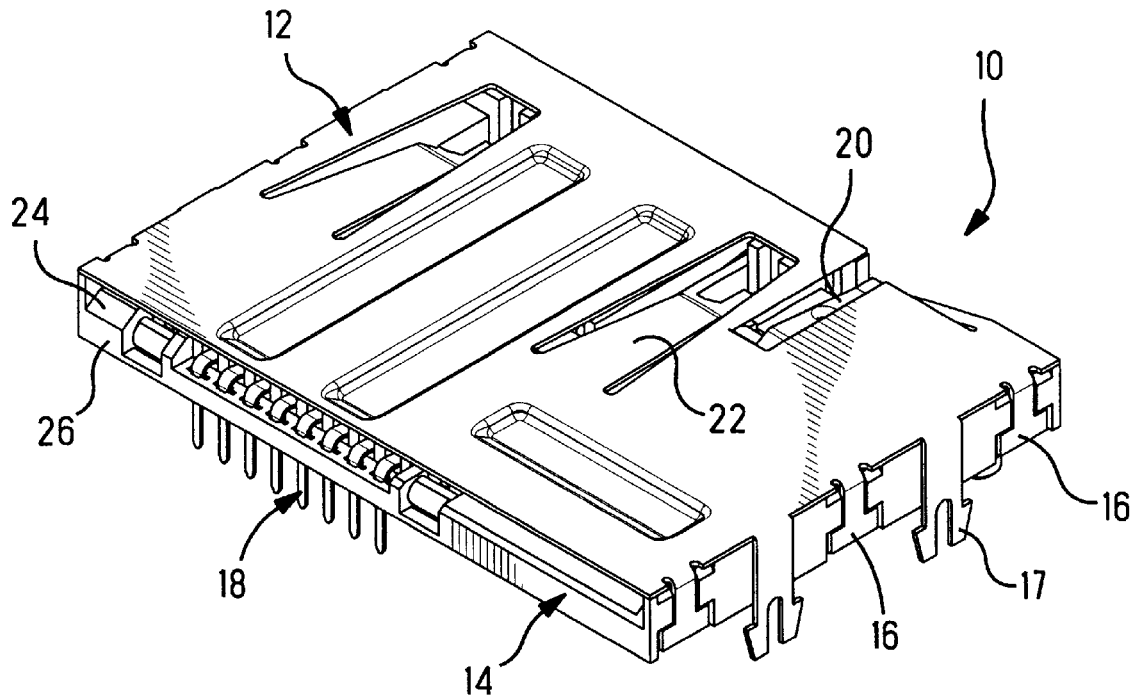
FIG. 1 shows a three-dimensional view of the smart card reader according to this invention.
Figure 2:
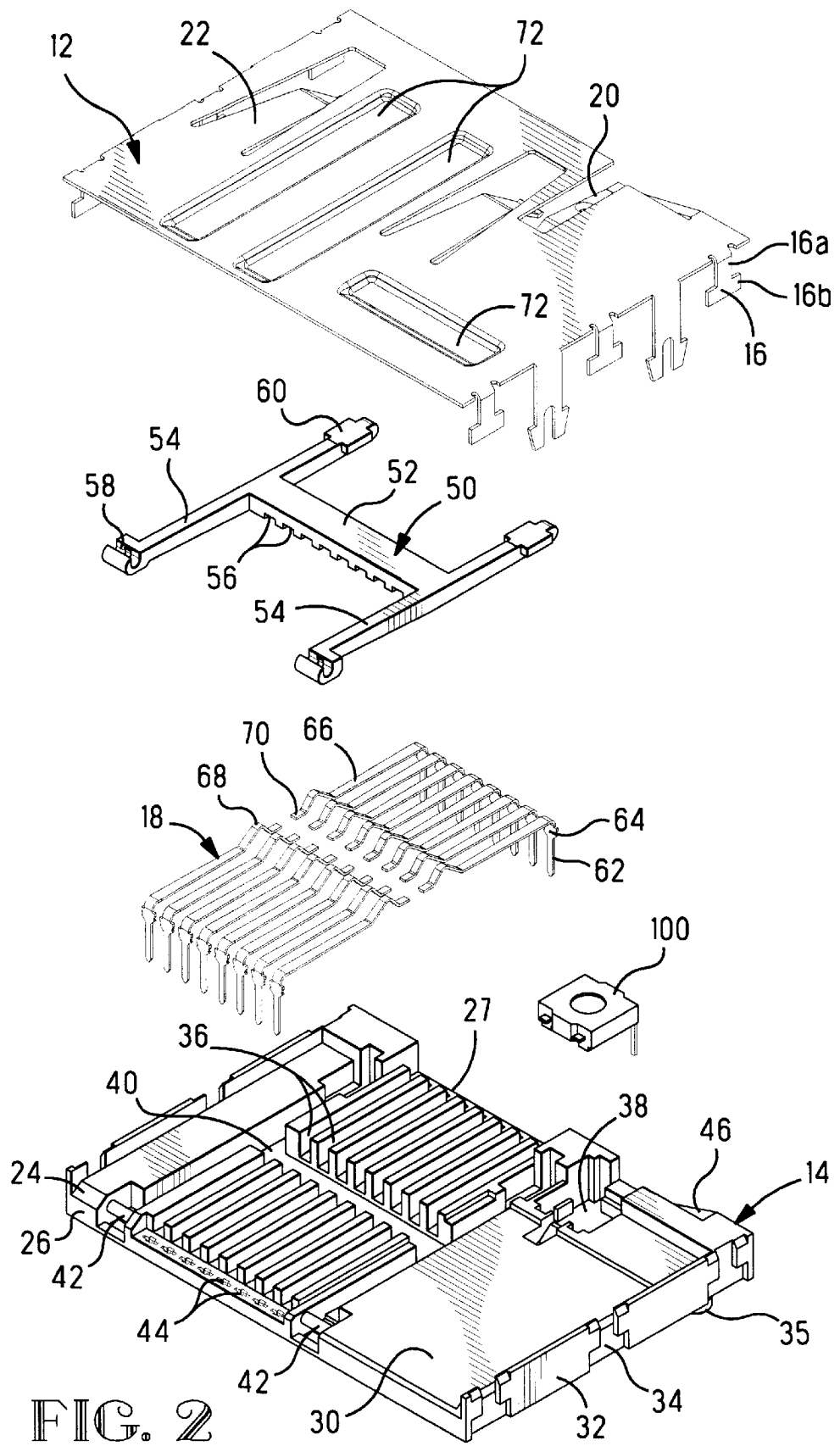
FIG. 2 shows an exploded three-dimensional view of the smart card reader.

The invention will first be described generally with reference to FIG. 1. The smart card reader 10 is designed to have an insulative base 14, a cover 12 mounted to the base 14, and contacts 18 also mounted to the base 14. An opening 24 is provided along the first end 26 for receiving a smart card into a card-receiving area 30 (FIG. 2). The cover 12 is designed to have securing projections 16 for attachment to the base 14 and optional board locks 17 for securing the smart card reader 10 to a printed circuit board (not shown). A contact carrier actuator or spring arms 22 are formed from the cover 12 and extend into the card-receiving area 30. A switch actuator 20 is similarly formed from the cover 12 and also extends into the card-receiving area 30.

Each of the major components will now be described in greater detail with reference to FIG. 2. The base 14 is profiled to have a lead-in section 25 along a first end 26 which leads into a card-receiving area 30. Contact-securing passageways 44 are provided proximate the first end 26 and proximate the second end 27. A plurality of slots 36 extend each from a respective contact-securing passageway 44 to the center of a carrier-receiving area 40. The carrier-receiving area 40 is generally H shaped having a center section and two side sections. Each of the side sections ends at the first end 26 where a hinge bar 42 is located between side walls thereof. A switch-receiving area 38 is provided along the second end 27 and is in communication with an actuator-receiving area 46 also disposed along the second end 27. A micro switch 100 is disposed in the switch-receiving area 38. The micro switch 100 has contacts which extend from the switch-receiving area 38 to a printed circuit board. Securing member receiving areas 34 are provided along housing sidewalls 32, and locating projections 35 are provided on the underside of the insulative housing 14 for positioning the housing 14 properly on a printed circuit board.

Referring again to FIG. 2, the carrier 50 is shown as being generally H-shaped having a center arm 52 which joins two side arms 54. The center arm 52 is profiled to have a plurality of contact-receiving channels 56 along its bottom side. Each of the side arms 54 is profiled to have a hinge section 58 at one free end and an actuating pad 60 at the opposite free end.

The contacts 18 will now be described in greater detail again with reference to FIG. 2. Each contact 18 consists of a tail 62 for mounting to a printed circuit board, a securing section 64, and a cantilever arm 66 extending from the securing section 64 at approximately a right angle. The cantilever arm 66 is profiled to have a contact section 68 and a tab 70 at the free end thereof. The cantilever arms 66 are elastically deformed to exert a force against the contact receiving channels 56.

Figure 3:
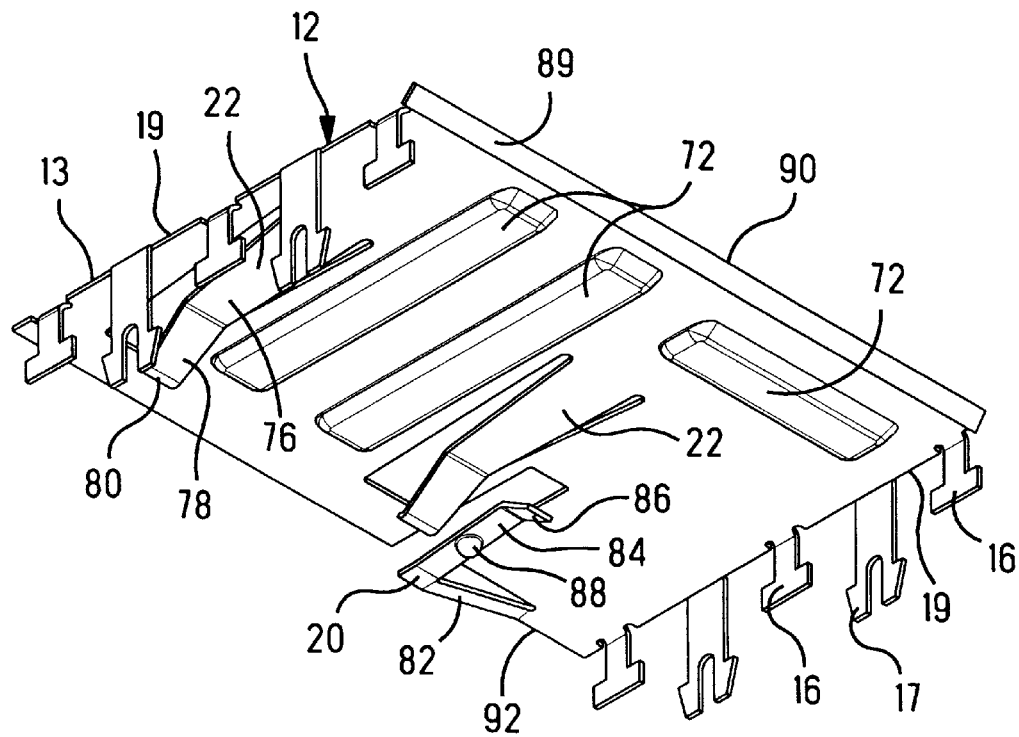
FIG. 3 shows a three-dimensional view of the cover taken from the underside.

The cover 12 will now be described in greater detail with reference to FIGS. 2 and 3. The cover 12 is generally planer having a top wall 13 from which the features to be described are all formed. Spring arms 22 are stamped from the top wall 13 and are profiled to have a main body section 76 which is bent slightly toward the card-receiving area 30. An intermediate section 78 extends from the main body section 76 and is bent from the main body section 76 again toward the card-receiving area 30. Finally, a free end section 80 extends from the intermediate section 78 and is bent back towards the top wall 13 such that it is approximately parallel to the main body section 76. A switch actuator 20 is similarly stamped and formed from the top wall 13 such that is has a first arm 82 extending from the top wall 13 and a second arm 84 extending substantially perpendicular to the first arm 82. A lead-in section 86 is bent from the second arm 84 and an actuating projection 88 is disposed along the undersurface of the second arm 84. Depressions 72 are also formed from the top wall 13 and serve to press an inserted card firmly against the contacts 18. Securing projections 16 are bent from side edges 19. Each securing projection 16 has an extention arm 16a extending from the top wall 13 and a securing arm 16b disposed at the free end of the extention arm 16a.

An optional lead-in surface 89 can be provided along the first edge 90 for guiding a card into the card-receiving area 30. Optional board locks 17 are shown which are similarly stamped and formed from the cover top wall 13 and extend downward beyond the securing projections 16 to cooperate with board lock openings in a printed circuit board. An advantage to this boardlock design is that the board locks 17 are oriented from front to back, that is in the direction of card insertion to resist high mating forces. An additional advantage of this design is that electrostatic discharge protection could be provided by soldering the board locks 17 to ground circuits of a printed circuit board.

Figure 4:
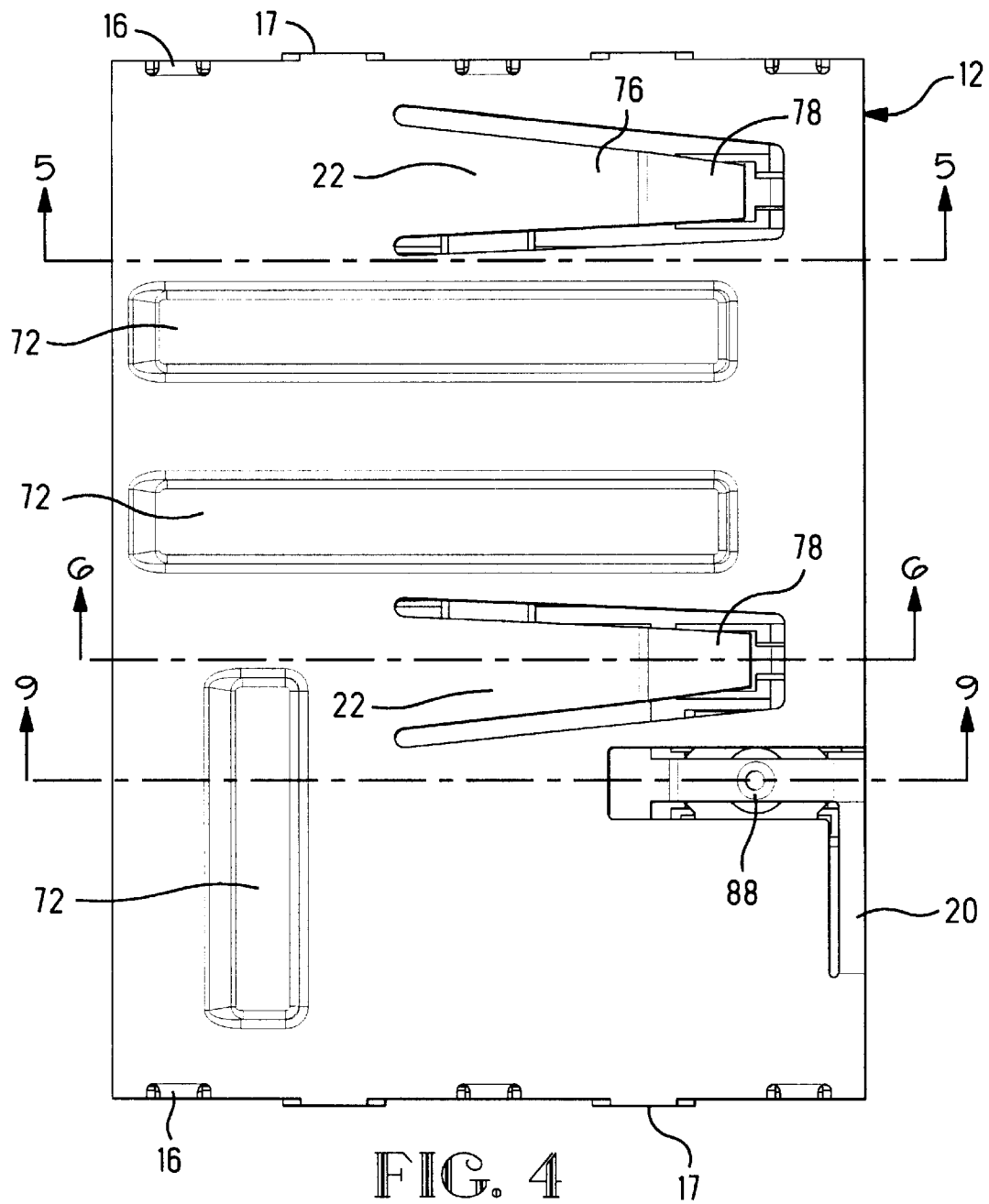
FIG. 4 shows a top view of the cover.
Figure 5:
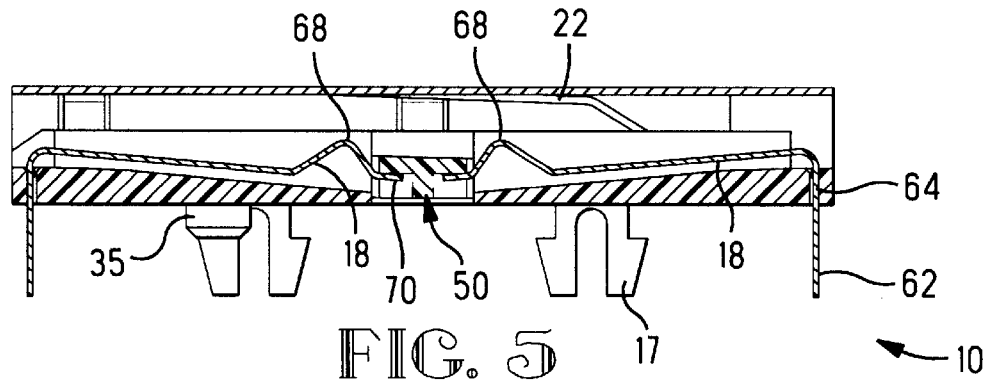
FIG. 5 shows a cross-sectional view of the smart card reader taken along the line 5—5 of FIG. 4.
Figure 6:
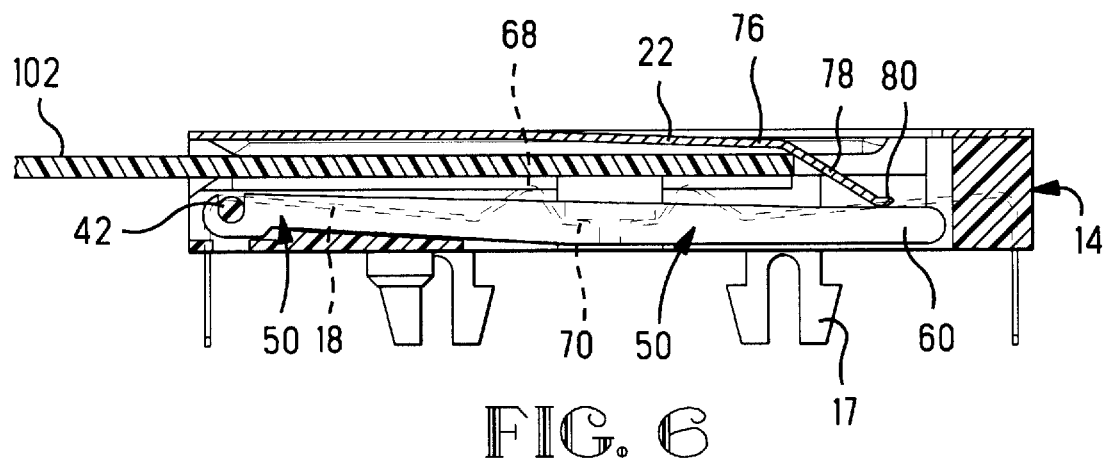
FIGS. 6–8 are a progression of sectional views taken along the line 6—6 of FIG. 4 as a card is being inserted into the smart card reader.
Figure 7:
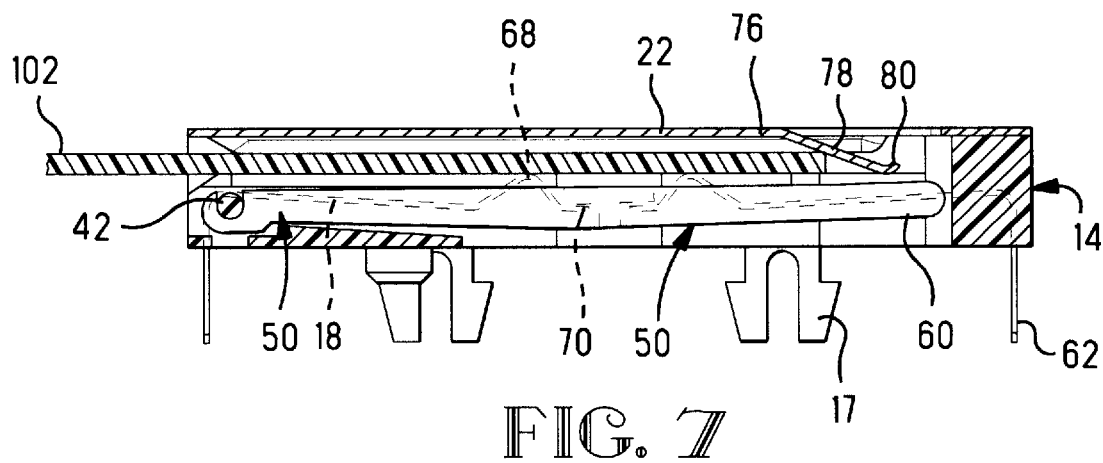
Figure 8:
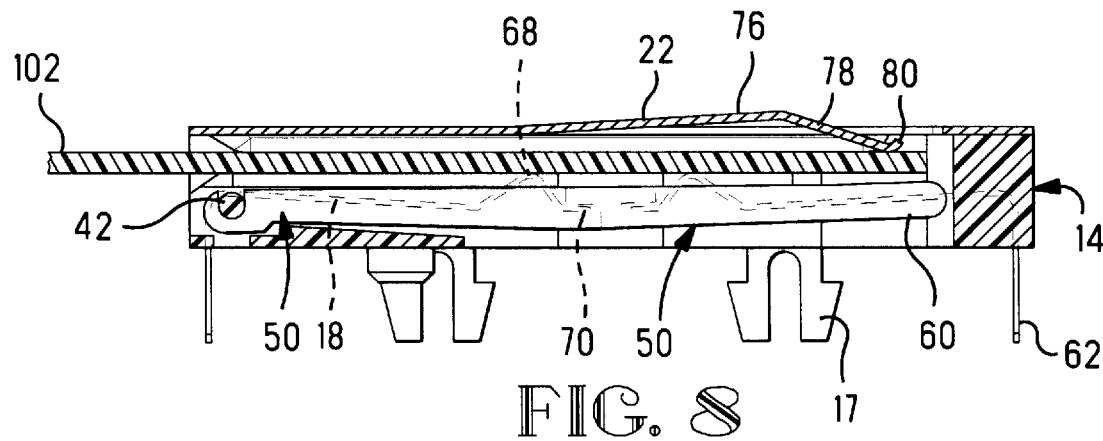

A mating cycle will now be described in greater detail with reference to FIGS. 4 to 10. Referring first to FIG. 4, the smart card reader 10 is shown in the idle position prior to insertion of a smart card 102. It should be noted that at this point the spring arms 22 are positioned such that their free-end sections 80 are in engagement with the actuating pads 60 of the carrier 50 (FIG. 6). The carrier 50 and contacts 18 are therefore biased downward so that the contact sections 68 will not engage the undersurface of the inserted card 102. As the card 102 is inserted, it will first engage the intermediate section 78 of the spring arm 22. Further insertion of the card 102 will urge the spring arm 22 away from the carrier 50 which will follow the motion of the spring arm 22 because the contacts 18 spring naturally toward the card 102 (FIG. 7). As the card 102 is further urged into the card-receiving opening 30, the spring arm 22 will continue moving upward until the contact sections 68 engage pads of the card 102. A wiping action will occur as the card 102 travels from the position of FIG. 7 to that of FIG. 8. FIG. 8 shows the card 102 fully inserted in the read position.

Figure 9:
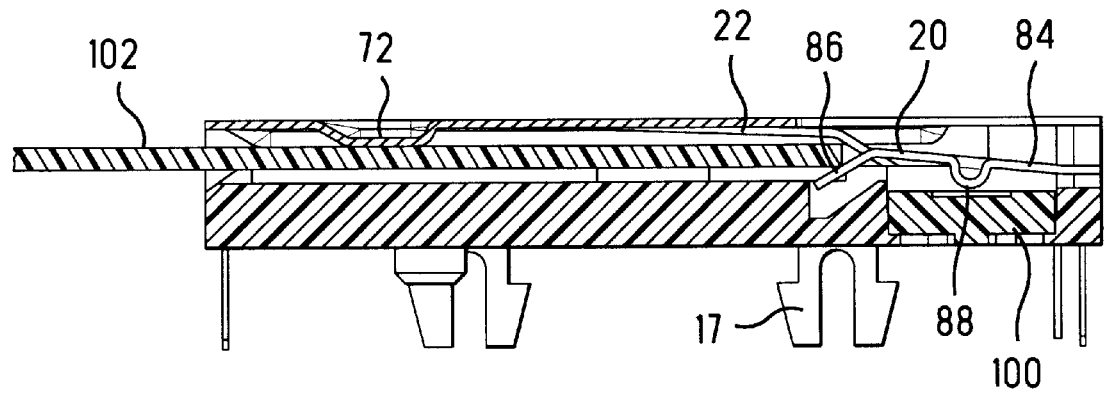
FIGS. 9–11 show a similar progression taken along the line 9—9 of FIG. 4.
Figure 10:
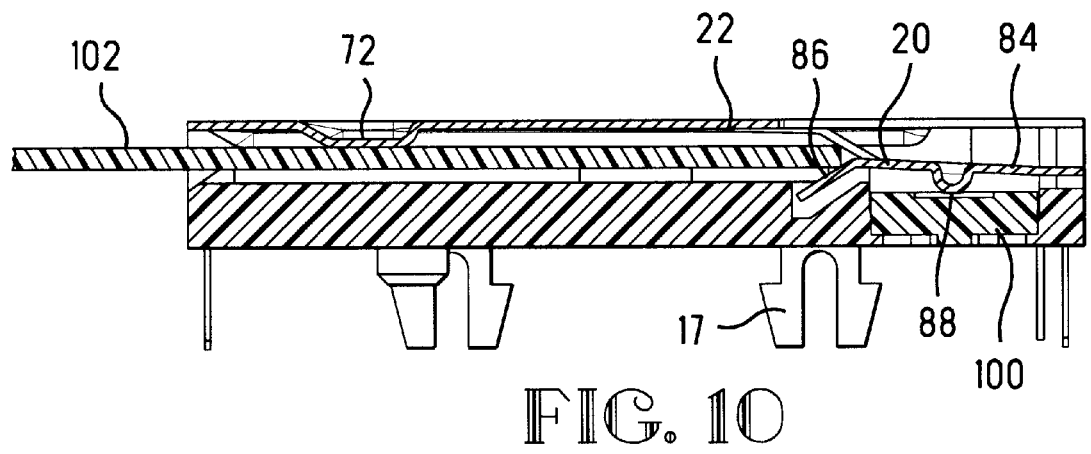
Figure 11:
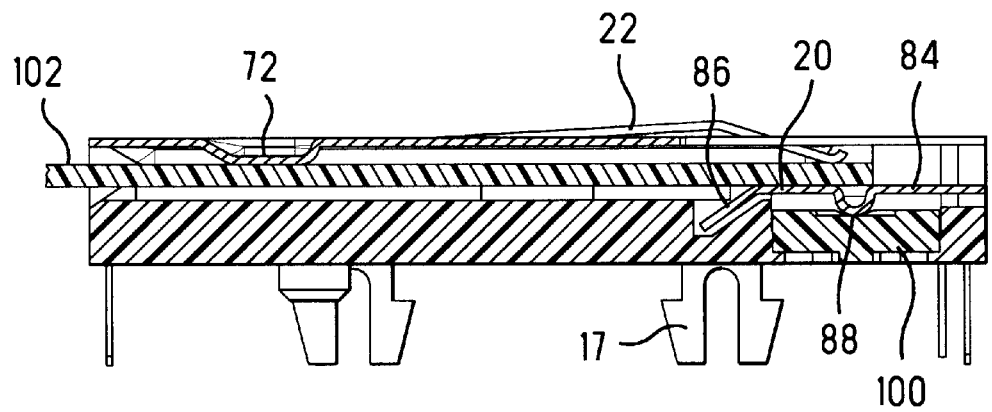

Referring now to FIGS. 9 through 11, operation of the switch actuator 20 will now be described in further detail. FIG. 9 shows the switch actuator 20 in its relaxed idle position spaced apart from the microswitch 100. As a card 102 is inserted into the card-receiving opening 30, it will pass depression 72 and engage the spring arms 22, as described above, and the lead-in surface 86 of the switch actuator 20 (FIG. 9). As the card 102 is further urged into the card-receiving opening 30, it will urge the second arm 84 downward until the projection 88 contacts the microswitch 100 (FIG. 11). When the microswitch 100 is actuated, this defines the read position (FIG. 11). The microswitch 100 is designed to sense when the card 102 is in the read position in order to actuate circuits on the printed circuit board for reading the inserted card 102. Upon removal of the card 102, all of the moving parts will follow a reverse progression from FIGS. 11 back to 5. It should be noted at this point that because the spring arms 22 are formed such that the intermediate section 78 is angled in relation to the card 102, they will tend to exert a slight eject force on the card 102 upon withdraw.

An advantage of this invention is that it provides a simple design for pivoting the contacts 18 from an idle position (FIG. 5) to a fully inserted read position (FIG. 8) using simple features formed from the cover 12 to actuate the carrier 50.

An alternate embodiment is shown in FIGS. 12 and 13. Referring to FIG. 12, this base 314 is designed to have a fewer number of contacts 318 and a generally U-shaped contact carrier actuator 350. It should be noted that this design does not require any features to be stamped and formed into a cover which is not shown for simplicity. The base 314 features board locks 335 and a similar card-receiving area 330. Contact slots 336 are provided near each end 326, 327 and extend inward toward the contact carrier actuator 350. The contact carrier actuator 350 is profiled to have hinge projections 358 extending from each of its sides into a respective channel 342 of the base 314. The hinged projections 358 provide a pivot joint on which the contact carrier actuator 350 can pivot. The contact carrier 350 has a contact carrier 351 with a contact receiving area on a first side of the pivot joint. Cam surfaces 321 are provided on a second side of the pivot joint and a switch actuator 320 is similarly provided at one of the free ends on the second side of the pivot joint. In this embodiment, the contacts 318 are loaded opposite those of the first embodiment such that they will tend to force the contact carrier 351 away from the card-receiving opening 330. Upon insertion of a smart card 102, it will pass over the contacts 318 until it first engages the cam surface 321 to pivot the contact carrier actuator 350 and the contacts 318 upward toward the pads of the smart card 102. The switch actuating section 320 will simultaneously rotate to depress the microswitch 100 and indicate the read position.

The advantage of this embodiment is that it provides a simplified design for the carrier and the contacts which require no special features to be formed into the cover 12. Additionally, there are no springs required in this design because the contacts are formed to naturally spring away from the card.

Figure 14:
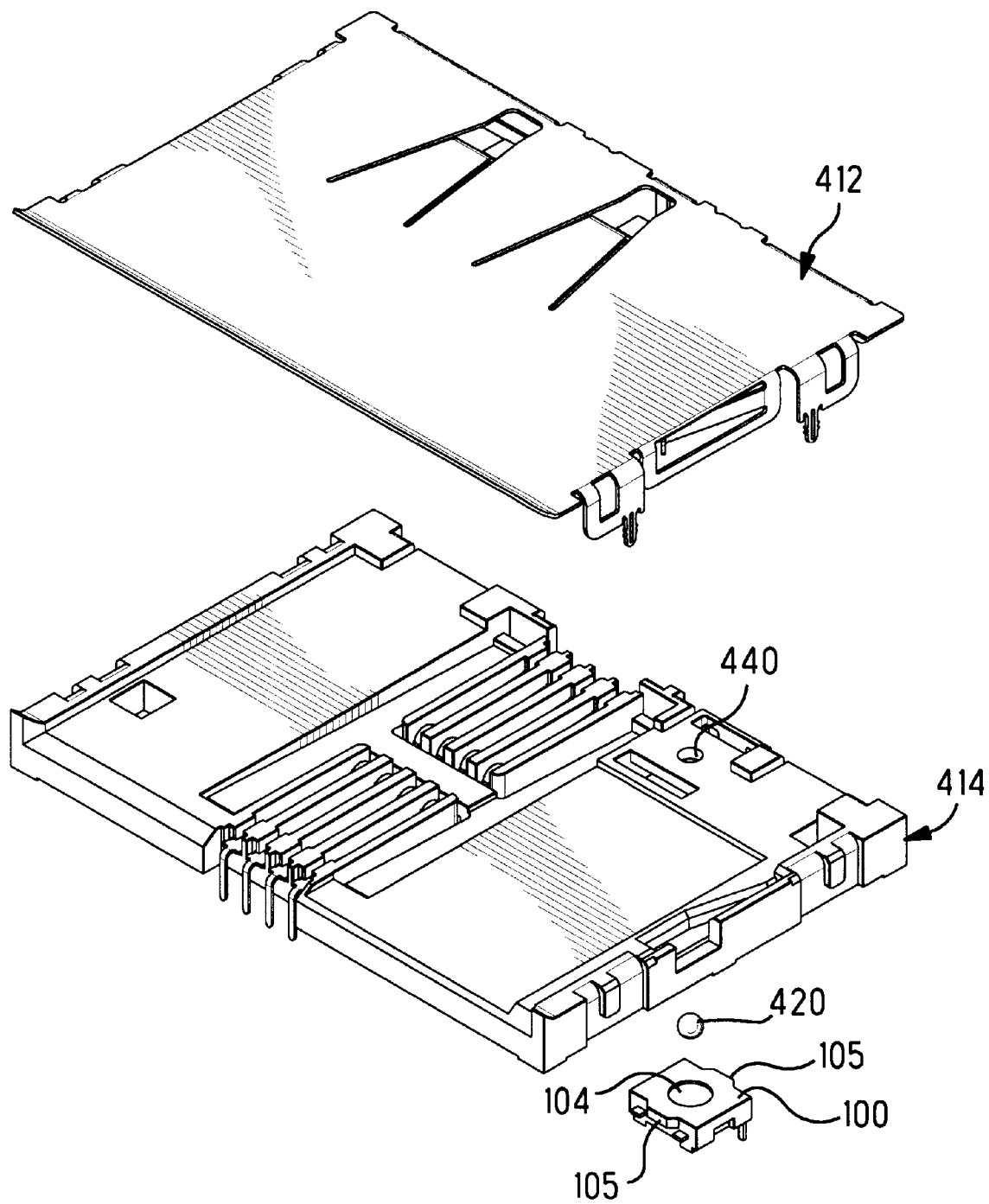
FIG. 14 shows an exploded three-dimensional view of another alternate embodiment of the smart card reader according to this invention.
Figure 15:
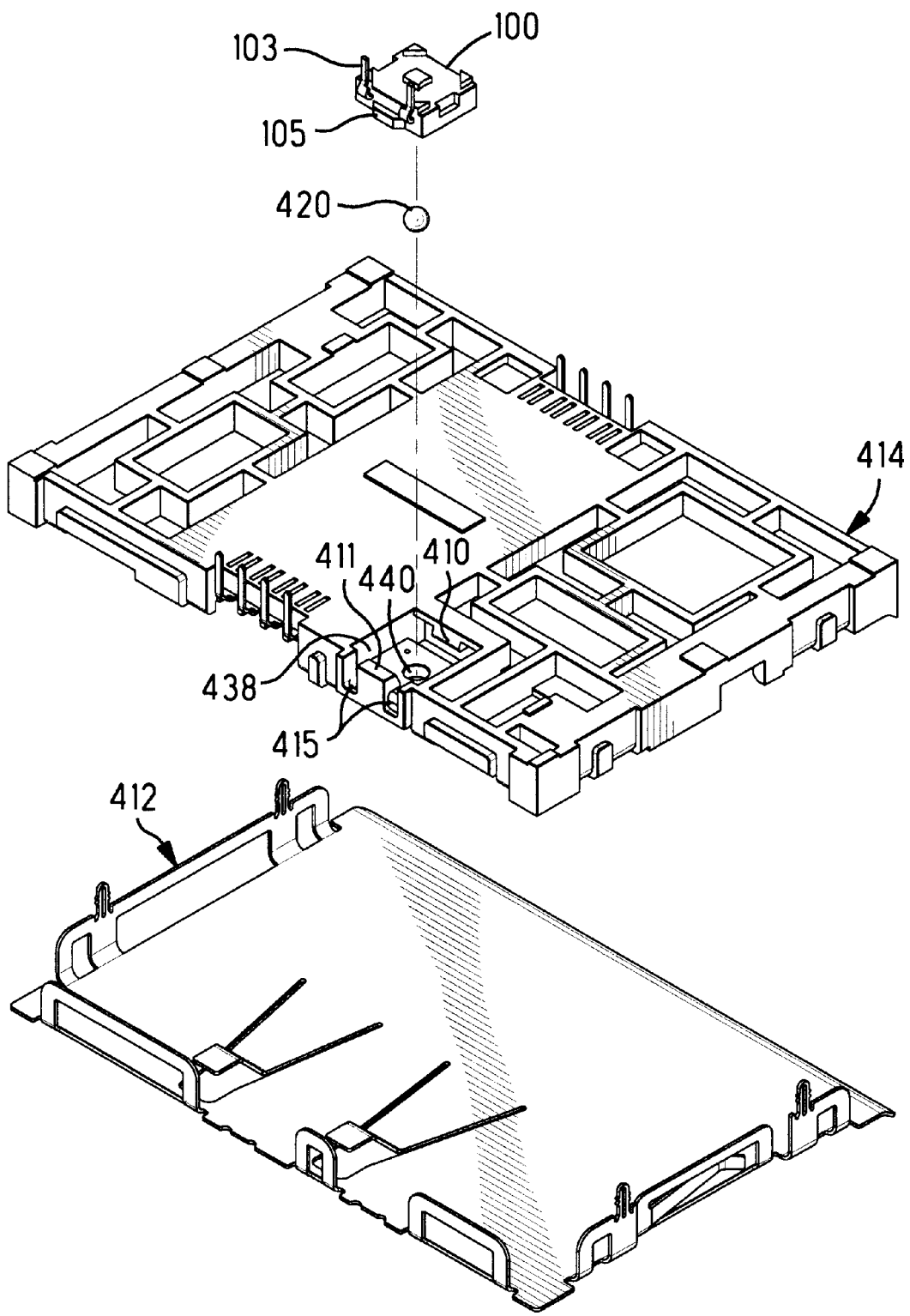
FIG. 15 shows an exploded three-dimensional view of the smart card reader of FIG. 14 as viewed from the bottom.
Figure 16:
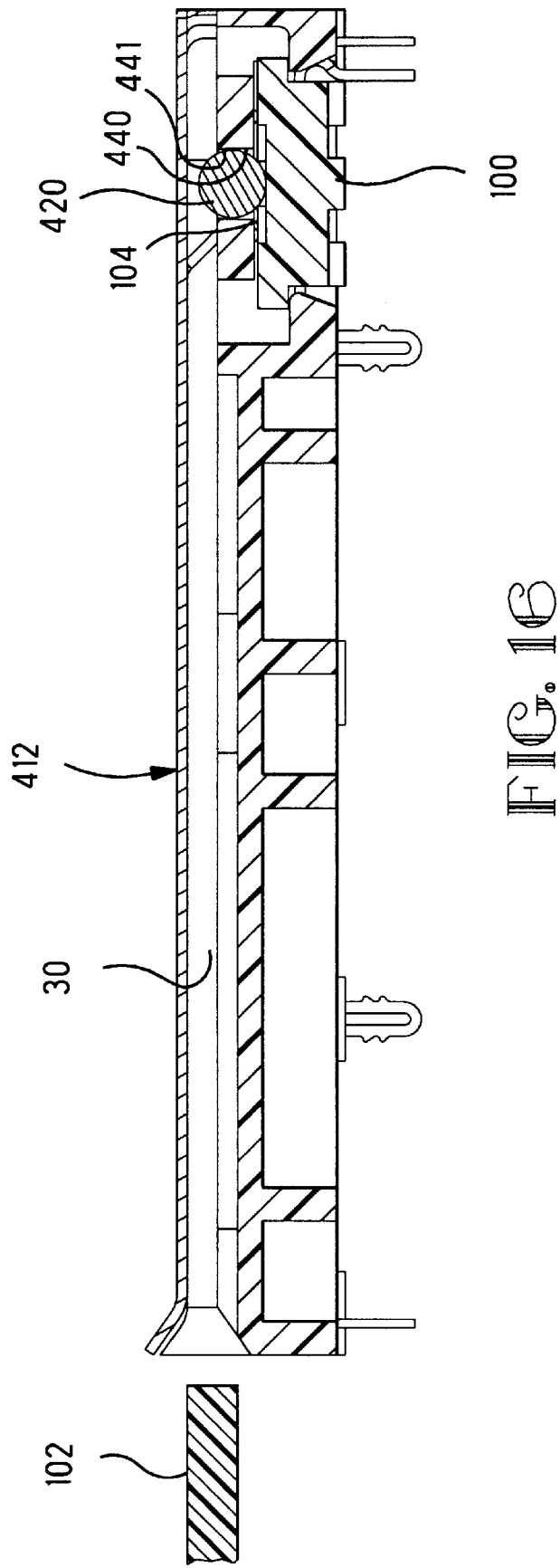
FIG. 16 shows a cross-sectional view of an assembled smart card reader of FIG. 15.

Another alternate embodiment is shown in FIGS. 14–16. Referring first to FIGS. 14 and 15 it can be seen that the cover 412 is substantially similar to the cover 12 except that it does not contain any switch actuator. The base 414 is substantially similar to the base 14 except that the switch receiving area 38 has been altered (FIG. 15). The switch receiving area 438 is open to the bottom surface of the base 414 as shown in FIG. 15. An apeture 440 is located in the switch receiving area 438 and is dimensioned to receive the actuator 420. It is preferred to conform the aperture 440 to the actuator shape at the tapered section 441 in order to constrain the actuator 420. A locking projection 410 extends into one side of the switch receiving area 438 and a latching projection 411 extends into the switch receiving area 438 from a side opposite the locking projection 410. Grooves 415 extend from the switch receiving area 438 for accommodating contacts 103 of the switch 100.

The switch 100 is profiled to have a pair of tabs 105 extending from opposite ends, and contacts 103 for mounting to a printed circuit board (not shown). A button 104 (FIG. 14) consists of a contact surface which is biased outwardly from the switch 100. Depressing the button 104 will actuate the switch 100 and releasing the button 104 will cause it to return to its original biased position.

The actuator 420 is spherically shaped and positioned over the button 104 as can be best seen in FIG. 16. Mounting the switch 100 to the housing 414 traps the actuator or ball 420 between the button 104 and the tapered section 441 of the aperture 440. The actuator 420 is profiled to partially project through the aperture 440 when assembled (FIG. 16). It should be noted here that while it is preferred to trap the actuator 420 between the tapered section 441 and the button, it can be captured between the cover and button without a tapered section 441. A ball is the preferred shape for the actuator 420 because it provides a curved surface for engaging a card 102 which is inserted into a card receiving area 30. It should be understood however that other shapes for the actuator 420 may be used as long as it provides a lead in surface to engage a card 102 and a surface for actuating the switch 100.

Operation of the switch 100 will now be described in greater detail with reference to FIG. 16. As a card 102 is inserted into the card receiving opening 30 it will engage the spring arms as described above and will then engage the actuator 420. As the card 102 is further urged into the card receiving opening 30. It will cause the actuator 420 to depress the button 104 and actuate the switch 100. Upon removal of the card 102, the button 104 will urge the actuator 420 back to its original position as shown in FIG. 16.

An advantage of this embodiment is that it provides a simple actuating mechanism without the need to form an actuator in the cover 412.

While the foregoing has been provided with reference to the embodiments, various changes within the spirit of the invention will be apparent to those reasonably skilled in the art. For example various features of each embodiment may be combined with features of another embodiment. Also, while the embodiments have been described with reference to a smart card, the invention not limited to such cards. Thus, the invention should be considered as limited only by the scope of the claims.

We claim:

1. A smart card reader having a base, a cover secured to the base over a card receiving area, a contact carrier being pivotally attached to the base, a plurality of contacts secured to the base and extending into contact receiving areas of the contact carrier, the cover being characterized by:

a top wall having a first edge proximate a mating end of the base, a pair of side edges proximate side walls of the base, and a rear edge extending between the side edges; and at least one spring arm having a free end and extending from the top wall into the card receiving area; and wherein the spring arm and the contact carrier cooperate such that, when a card is not occupying the card receiving area, the free end urges the contact carrier away from the card receiving area, and, when a card is inserted into the card receiving area, the card contacts a portion of the spring arm extending into the card receiving area thereby urging the spring arm to facilitate movement of the contact carrier toward the card receiving area such that the contacts contact the card.

2. The smart card reader as recited in claim 1 further comprising:

at least one securing member extending from a side edge generally perpendicular to the top wall and along a side wall of the base into a complementary securing area.

3. The smart card reader as recited in claim 1 wherein the cover further comprises at least one depression which extends into the card receiving area for exerting a contact enhancing force on a top surface of a card.

4. The smart card reader as recited in claim 1 wherein the cover further comprises a switch actuator extending from the top wall into the card receiving area.

5. The smart card reader as recited in claim 4 wherein the switch actuator comprises a cantilever arm having a lead in surface facing the first edge.

6. The smart card reader as recited in claim 5 wherein the switch actuator further comprises a projection along the cantilever arm proximate its free end for engaging a microswitch.

7. The smart card reader as recited in claim 1 wherein the spring arm is stamped and formed from the top wall, the spring arm having a main body section attached to the top wall, an intermediate section extending from the main body section and being bent slightly toward the card receiving area, and a free end section extending from the intermediate section and being bent toward the top wall.

8. The smart card reader as recited in claim 2 wherein the securing member comprises an extension arm attached to the top wall and a securing arm attached to the extension arm.

9. The smart card reader as recited in claim 8 wherein the securing arm is disposed perpendicular to the extension arm, the securing arm being profiled to be received in a recess disposed in the complementary securing area of the base.

10. A smart card reader having an insulative base and a plurality of cantilevered electrical contacts extending from ends of the base toward a center comprising:

a contact carrier having a contact receiving area disposed proximate the center of the insulative base and on a first side of a pivot joint, a cam surface disposed on a second side of the pivot joint, and a switch actuator disposed adjacent the cam surface; the contact carrier being pivotably attached to the insulative base and in engagement with free ends of the cantilevered electrical contacts, whereby the electrical contacts and the contact receiving area are biased toward the insulative base until a card is inserted into the smart card reader and urged against the cam surface to pivot the carrier toward the card such that the electrical contacts engage pads of the inserted card.

11. A card reader having a base and a cover to define a card receiving area, the card reader comprising:

a contact carrier being pivotally attached to the base and connected to one or more contacts;

at least one spring arm having a free end and extending from the cover into the card receiving area;

wherein the spring arm and the contact carrier cooperate such that, when a card is not occupying the card receiving area, the free end urges the contact carrier away from the card receiving area, and, when a card is inserted into the card receiving area, the card contacts a portion of the spring arm extending into the card receiving area thereby urging the spring arm away to facilitate movement of the contact carrier toward the card receiving area such that the contacts contact the card;

a switch located in the base adjacent the card receiving area; and a switch actuator located in the base so as to be in communication with the switch.

12. The card reader as recited in claim 11 wherein the switch actuator is a ball.

13. The card reader as recited in claim 11 wherein the switch is a microswitch having a button which is biased to a normally open position.

14. The card reader as recited in claim 12 wherein the housing has an aperture profiled to have a tapered section for engaging the ball.

15. The card reader as recited in claim 14 wherein the ball is positioned between the aperture and the switch.

16. The card reader as recited in claim 15 wherein the switch has a button which engages the ball to bias the ball toward the aperture.

17. The card reader as recited in claim 11 wherein the switch actuator engages a card inserted into the card receiving area to cause actuation of the switch.

18. A card reader comprising:

a housing defining a card receiving area;

a contact carrier in the housing and operatively connected to one or more contacts;

a contact carrier actuator having a contact portion that extends into the card receiving area when there is no card occupying the card receiving area;

wherein the contact carrier actuator and the contact carrier are configured and cooperate such that, when a card is not occupying the card receiving area, the contact carrier is disposed away from the card receiving area, and, when a card is inserted into the card receiving area, the card contacts the contact portion causing the contact carrier actuator to move thereby effecting the movement of the contact carrier toward the card receiving area such that the contacts contact the card.

19. The card reader of claim 18, wherein the contact carrier actuator comprises a spring arm having a free end and the contact portion, and the contact carrier is biased toward the card receiving area such that, when the card receiving area is unoccupied, the free end operatively urges the contact carrier away from the card receiving area, and, when a card is inserted into the card receiving area, the card contacts the contact portion causing the free end to move such that the contact carrier is able to move toward the card receiving area.

20. The card reader of claim 18, wherein the contact carrier actuator is operatively connected to the contact carrier and pivotally mounted such that the contact carrier is on one side of the pivot and the contact portion is on the other side of the pivot, and the contact carrier is biased away from the card receiving area such that, when the card receiving area is unoccupied, the actuator exerts no substantial force against the contact carrier and thus the contact carrier remains biased away from the card receiving area, and, when a card is inserted into the card receiving area, the card contacts the contact portion causing the contact carrier actuator to pivot thereby effecting movement of the contact carrier toward the card receiving area.

* * * * *